United States Patent
Shioda (10) Patent No.: US 9,670,881 B2
(45) Date of Patent: Jun. 6, 2017

(54) SUPERCHARGER-EQUIPPED INTERNAL COMBUSTION ENGINE

(75) Inventor: Jumpei Shioda, Susono (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 14/352,181

(22) PCT Filed: Nov. 18, 2011

(86) PCT No.: PCT/JP2011/076679
§ 371 (c)(1),
(2), (4) Date: Apr. 16, 2014

(87) PCT Pub. No.: WO2013/073052
PCT Pub. Date: May 23, 2013

(65) Prior Publication Data
US 2014/0366533 A1    Dec. 18, 2014

(51) Int. Cl.
*F02B 33/44* (2006.01)
*F02M 25/07* (2006.01)
(Continued)

(52) U.S. Cl.
CPC ....... *F02M 25/0701* (2013.01); *F02B 37/025* (2013.01); *F02M 25/06* (2013.01);
(Continued)

(58) Field of Classification Search
CPC ............. F02M 25/0709; F02M 25/071; F02M 25/0722; F02M 35/10157;
(Continued)

(56) References Cited

U.S. PATENT DOCUMENTS 9,388,746 B2 * 7/2016 Russ ............... F02D 9/1055
2011/0011084 A1 * 1/2011 Yanagida et al. ......... 60/605.2
(Continued)

FOREIGN PATENT DOCUMENTS

DE   10 2009 056 544 A1   6/2010
FR             2939478    * 4/2008 ............. F02M 35/10
(Continued)

OTHER PUBLICATIONS

International Search Report Issued Feb. 21, 2012 in PCT/JP11/076679 Filed Nov. 18, 2011.
(Continued)

*Primary Examiner* — Thai Ba Trieu
*Assistant Examiner* — Thomas Olszewski
(74) *Attorney, Agent, or Firm* — Oblon, McClelland, Maier & Neustadt, L.L.P.

(57) ABSTRACT

A supercharger-equipped internal combustion engine in the present invention includes a turbo-supercharger (20) which includes, at some point in an intake passage (26), a centrifugal compressor (20*b*) having an impeller section (20*b*4) for housing a compressor impeller (20*b*3). In the supercharger-equipped internal combustion engine, EGR gas and blow-by gas are introduced into an intake system in such a way as to flow into the centrifugal compressor (20*b*) via an EGR gas introduction section (40*a*) and a blow-by gas introduction section (48*a*). The supercharger-equipped internal combustion engine further includes a partition wall (52) which guides the EGR gas and the blow-by gas toward the centrifugal compressor (20*b*) so that the EGR gas and the blow-by gas are not mixed with each other until the EGR gas and the blow-by gas enter into the impeller section (20*b*4).

5 Claims, 5 Drawing Sheets (51) Int. Cl.
  *F02B 37/02* (2006.01)
  *F04D 29/58* (2006.01)
  *F02M 25/06* (2016.01)
  *F04D 27/02* (2006.01)
  *F02M 26/09* (2016.01)
(52) U.S. Cl.
  CPC ......... *F02M 26/09* (2016.02); *F04D 27/0207* (2013.01); *F04D 29/5846* (2013.01); *Y02T 10/121* (2013.01); *Y02T 10/144* (2013.01)
(58) Field of Classification Search
  CPC ....... F02M 35/10222; F02M 35/10262; F02M 25/06; F02M 25/0718; F02B 29/0425; Y02T 10/121; Y02T 10/144; Y02T 10/146
  USPC .......................................... 60/605.2; 123/572
  See application file for complete search history.

(56) References Cited

U.S. PATENT DOCUMENTS

2012/0297768 A1* 11/2012 Lischer ......................... 60/605.2
2013/0014503 A1* 1/2013 Romblom ............... F01D 9/026
                                                              60/605.1

FOREIGN PATENT DOCUMENTS

| FR | 2 939 478 A1 | 6/2010 |
|----|--------------|--------|
| JP | 2005 23792 | 1/2005 |
| JP | 2006 348781 | 12/2006 |
| JP | 2007 309257 | 11/2007 |
| JP | 2008-150956 A | 7/2008 |
| JP | 2009 264158 | 11/2009 |
| JP | 2010 71140 | 4/2010 |
| JP | 2011 21561 | 2/2011 |
| JP | 2011 179477 | 9/2011 |
| WO | WO 2011/102959 A2 | 8/2011 |

OTHER PUBLICATIONS

Extended European Search Report issued on Nov. 10, 2014 in the corresponding European Application No. 11875838.2.
Combined Chinese Office Action and Search Report issued on Jul. 27, 2016 in Patent Application No. 201180074890.5 (with English language translation and English language translation of categories of cited documents).
Combined Chinese Office Action and Search Report issued Sep. 28, 2015 in Patent Application No. 201180074890.5 (with English language translation of categories of cited documents).

* cited by examiner

*1: Oil mist is present also at local high-temperature region of diffuser section → This generates deposits

*2: Deposits collection section
*3: Compressor impeller
*4: Heat caused by LPL-EGR (high-temperature region at inlet of compressor)

Fig. 5

*5: Oil mist is present only at low-temperatuer region of Diffuser section → Deposits is not generated

SUPERCHARGER-EQUIPPED INTERNAL COMBUSTION ENGINE

TECHNICAL FIELD

The present invention relates to a supercharger-equipped internal combustion engine, and more particular to a supercharger-equipped internal combustion engine which includes a centrifugal compressor.

BACKGROUND ART

So far, for example, Patent Document 1 discloses an internal combustion engine having a turbo-supercharger which includes a centrifugal compressor. This conventional internal combustion engine is provided with an EGR passage for recirculating recirculated exhaust gas (EGR gas) to an intake passage on the upstream side of the compressor from an exhaust system.

Including the above described document, the applicant is aware of the following documents as related art of the present invention.

If the EGR gas is introduced into an intake system from a section near the inlet of a compressor as in the internal combustion engine described in Patent Document 1, a high-temperature section is locally generated inside the compressor due to a lack of mixing of high-temperature EGR gas and low-temperature (ordinary temperature) fresh air. If blow-by gas is introduced into the intake system from a section near the inlet of the compressor in a situation in which the high-temperature section exists locally inside the compressor as described above, misty oil included in the blow-by gas comes into contact with the aforementioned high-temperature section, and, thereby, deposits may be produced and collected at section inside the compressor, such as its diffuser section. If such collection of the deposits progresses, there is a concern that performance degradation of the turbo-supercharger may occur.

CITATION LIST

Patent Documents

Patent Document 1: Japanese Laid-open Patent Application Publication No. 2006-348781
Patent Document 2: Japanese Laid-open Patent Application Publication No. 2010-71140
Patent Document 3: Japanese Laid-open Patent Application Publication No. 2005-23792
Patent Document 4: Japanese Laid-open Patent Application Publication No. 2007-309257
Patent Document 5: Japanese Laid-open Patent Application Publication No. 2011-21561

SUMMARY OF INVENTION

The present invention has been made to solve the problem as described above, and has its object to provide a supercharger-equipped internal combustion engine, which can favorably prevent deposits derived from oil included in blow-by gas from being collected inside a centrifugal compressor in the internal combustion engine that includes a supercharger having the centrifugal compressor and a configuration for introducing recirculated exhaust gas and blow-by gas into an intake system.

The present invention is a supercharger-equipped internal combustion engine that includes: a supercharger; an exhaust gas recirculation passage; and a blow-by gas passage.

The supercharger includes, at some point in an intake passage, a centrifugal compressor having an impeller section for housing a compressor impeller. The exhaust gas recirculation passage includes an exhaust gas recirculation introduction section connected with the intake passage, and recirculated exhaust gas flows through the exhaust gas recirculation passage. The blow-by gas passage includes a blow-by gas introduction section connected with the intake passage, and blow-by gas flows through the blow-by gas passage. Further, the recirculated exhaust gas and the blow-by gas are introduced to an intake system in such a manner as to flow into the centrifugal compressor via the exhaust gas recirculation introduction section and the blow-by gas introduction section.

Furthermore, the present invention further includes a gas guide member which guides the recirculated exhaust gas and the blow-by gas toward the centrifugal compressor so that the recirculated exhaust gas and the blow-by gas are not mixed with each other until the recirculated exhaust gas and the blow-by gas enter into the impeller section of the centrifugal compressor.

According to the present invention that includes the aforementioned gas guide member, the recirculated exhaust gas and the blow-by gas can be prevented from being mixed with each other until the recirculated exhaust gas and the blow-by gas enter into the impeller section of the centrifugal compressor. The gas flows through the inside of the centrifugal compressor toward the downstream side while circling. Therefore, the recirculated exhaust gas and the blow-by gas that are introduced inside the centrifugal compressor with being insulated from each other at its inlet are not mixed even when passing through the inside of the centrifugal compressor. Because of this, the present invention allows misty oil included in the blow-by gas to be prevented from coming into contact with a high-temperature section inside the centrifugal compressor that is generated due to high-temperature recirculated exhaust gas. As a result, the collection of deposits at the centrifugal compressor can be favorably prevented.

In addition, the gas guide member of the present invention may be a partition wall for separating the intake passage near an inlet of the centrifugal compressor, into an exhaust gas recirculation introduction passage into which the recirculated exhaust gas is introduced via the exhaust gas recirculation introduction section and a blow-by gas introduction passage into which the blow-by gas is introduced via the blow-by gas introduction section, and for insulating the recirculated exhaust gas and the blow-by gas from each other.

By including, as the gas guide member, the partition wall having the aforementioned configuration, the recirculated exhaust gas and the blow-by gas that are introduced into the intake passage can be surely prevented from being mixed with each other until the recirculated exhaust gas and the blow-by gas enter into the impeller section of the centrifugal compressor.

Moreover, the partition wall of the present invention may be formed so as to extend to an inside of an inlet section of the centrifugal compressor or a section immediately before the inlet section, from a position on an upstream side of each connection position of the exhaust gas recirculation introduction section and the blow-by gas introduction section with respect to the intake passage on an upstream side of the centrifugal compressor, and extend in parallel with a flow of intake air.

By including, as the gas guide member, the partition wall as configured above, the recirculated exhaust gas and the blow-by gas that are introduced into the intake passage can be more surely prevented from being mixed with each other until the recirculated exhaust gas and the blow-by gas enter into the impeller section of the centrifugal compressor.

Moreover, the gas guide member of the present invention may correspond to the exhaust gas recirculation introduction section and the blow-by gas introduction section, which include an exhaust gas recirculation open end and a blow-by gas open end, respectively, the exhaust gas recirculation open end and the blow-by gas open end being arranged so as to be located at positions that are separated in a radial direction of the compressor impeller in such a manner that a central axis of the compressor impeller is sandwiched between the exhaust gas recirculation open end and the blow-by gas open end, the exhaust gas recirculation open end and the blow-by gas open end being installed at positions close to the inlet section of the compressor.

By including, as a member corresponding to the gas guide member, the recirculated exhaust gas introduction section and the blow-by gas introduction section having the aforementioned configuration, the recirculated exhaust gas and the blow-by gas that are introduced into the intake passage can be more surely prevented from being mixed with each other until the recirculated exhaust gas and the blow-by gas enter into the impeller section of the centrifugal compressor.

Furthermore, the gas guide member of the present invention may correspond to the exhaust gas recirculation introduction section and the blow-by gas introduction section, which include an exhaust gas recirculation open end and a blow-by gas open end, respectively, the exhaust gas recirculation open end and the blow-by gas open end being arranged so as to open, into the impeller section or an compressor inlet section on an intake air upstream side of the impeller section, at positions that are separated in a radial direction of the compressor impeller.

By including, as a member corresponding to the gas guide member, the recirculated exhaust gas introduction section and the blow-by gas introduction section having the aforementioned configuration, the recirculated exhaust gas and the blow-by gas that are introduced into the intake passage can be more surely prevented from being mixed with each other until the recirculated exhaust gas and the blow-by gas enter into the impeller section of the centrifugal compressor.

DESCRIPTION OF EMBODIMENTS

First Embodiment

Figure 1:
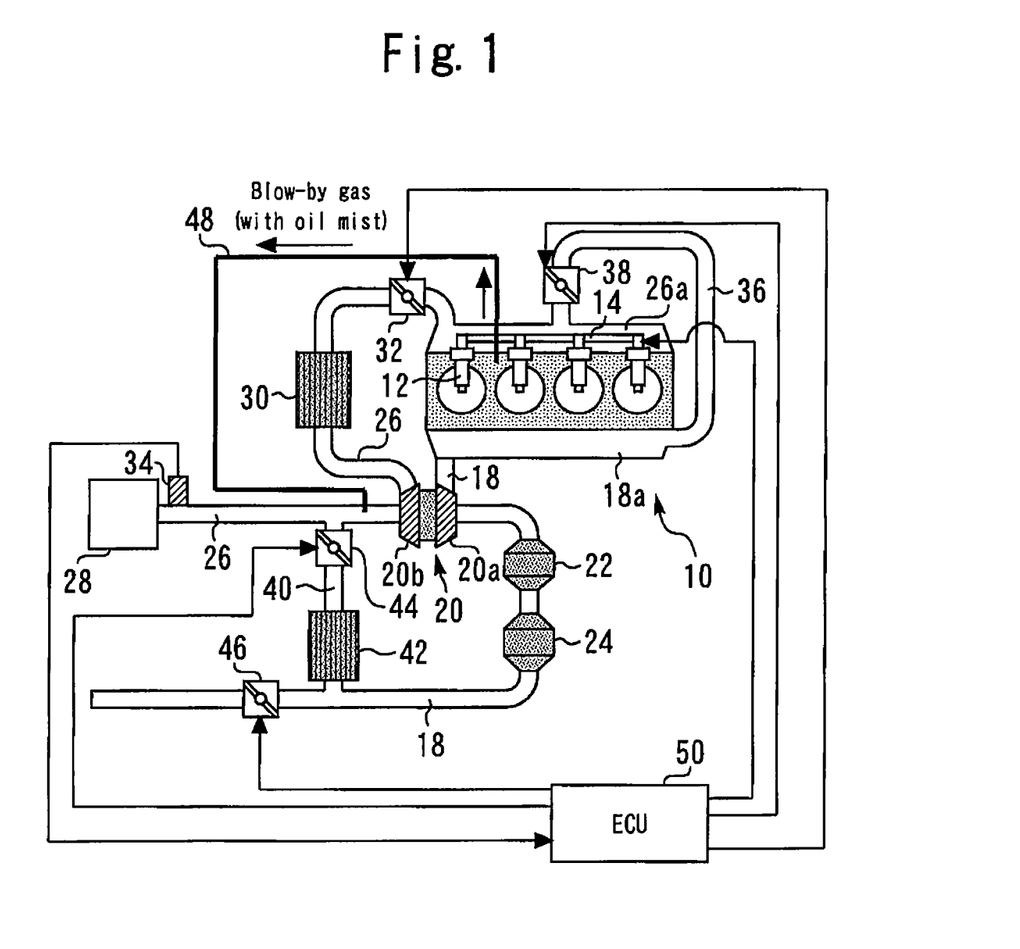
FIG. 1 is a diagram for explaining a system configuration of an internal combustion engine according to a first embodiment of the present invention.

FIG. 1 is a diagram for explaining a system configuration of an internal combustion engine 10 according to a first embodiment of the present invention. The system shown in FIG. 1 includes an internal combustion engine 10. It is assumed herein that the internal combustion engine 10 is, as an example, a four-cycle diesel engine (compression ignition internal combustion engine) 10 and is mounted in a vehicle to work as its power source. It is noted that the internal combustion engine according to the present invention is not limited to the diesel engine and may be a spark-ignited internal combustion engine (for example, gasoline engine). Although the internal combustion engine 10 of the present embodiment is of an in-line four-cylinder type, the number and arrangement of cylinders in the internal combustion engine in the present invention is not limited to the foregoing.

An injector 12 that directly injects fuel into the cylinder is installed in each cylinder of the internal combustion engine 10. The injector 12 of each cylinder is connected to a shared common-rail 14. In the common-rail 14, a high pressure fuel which is pressurized by a supply pump (not illustrated in the drawings) is supplied. Then, from this common-rail 14, the fuel is supplied to the injector 12 of each cylinder. The exhaust gas discharged from each cylinder is collected by an exhaust manifold 18a to flow into an exhaust passage 18.

Figure 2:
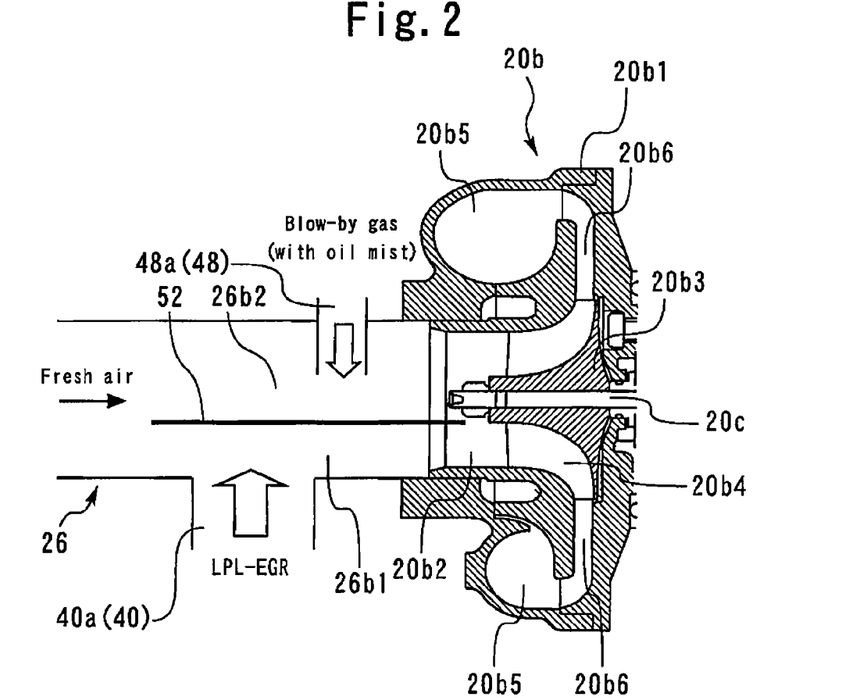
FIG. 2 is a cross-sectional view representing a characteristic configuration around the inlet of a compressor according to the first embodiment of the present invention.

The internal combustion engine 10 includes a turbo-supercharger 20. The turbo-supercharger 20 includes a turbine 20a which is operated by exhaust energy of exhaust gas, and a compressor 20b which is integrally coupled to the turbine 20a via a connecting axis 20c (see FIG. 2 described later) and is driven to rotate by the exhaust energy of the exhaust gas input to the turbine 20a. The compressor 20b is a centrifugal compressor as shown in FIG. 2 described later. The turbine 20a of the turbo-supercharger 20 is disposed at some point in the exhaust passage 18. In the exhaust passage 18 on the downstream side of the turbine 20b, an oxidation catalyst 22 and a DPF (Diesel Particulate Filter) 24 are installed in the order from the upstream side in order to purify the exhaust gas.

An air cleaner 28 is provided in the vicinity of the inlet of an intake passage 26 of the internal combustion engine 10. The air suctioned through the air cleaner 28 is compressed by the compressor 20b of the turbo-supercharger 20 and thereafter is cooled by an intercooler 30. The suctioned air which has passed through the intercooler 30 is distributed by an intake manifold 26a to flow into each cylinder. An intake throttle valve 32 is installed in the intake passage 26 between the intercooler 30 and the intake manifold 26a. Moreover, an air flow meter 34 for detecting the amount of intake air is installed near a portion on the downstream of the air cleaner 28 in the intake passage 26.

In addition, the system shown in FIG. 1 is provided with a high-pressure exhaust gas recirculation passage (HPL:

High Pressure Loop) 36. The HPL 36 is configured to allow the exhaust manifold 18a located upstream side of the turbine 20a to be communicated with the intake manifold 26a located downstream side of the compressor 20b. At some point of the HPL 36, an HPL-EGR valve 38 is disposed to adjust the amount of the recirculated exhaust gas (EGR gas) which flows back into the intake manifold 26a through the HPL 36.

Further, the system shown in FIG. 1 is provided with a low-pressure exhaust gas recirculation passage (LPL: Low Pressure Loop) 40. The LPL 40 is configured to allow the exhaust passage 18 located at the downstream side of the turbine 20a and the DPF 24 to be communicated with the intake passage 26 located at the upstream side of the compressor 20b. There are installed at some point of the LPL 40 in the order from the upstream side, an EGR cooler 42 for cooling EGR gas that flows through the LPL 40, and an LPL-EGR valve 44 for adjusting the amount of the EGR gas that flows back into the intake passage 26 through the LPL 40. In addition, an exhaust throttle valve 46 is disposed in the exhaust passage 18 on the downstream side of a connection section between the LPL 40 and the exhaust passage 18.

Moreover, the system shown in FIG. 1 is provided with a blow-by gas passage 48 by which the inside of a head cover that is not illustrated in the drawings is communicated with the intake passage 26 on the upstream side of the compressor 20b. The blow-by gas passage 48 is one of the composing elements of a positive crankcase ventilation system (not illustrated in the drawings) for treating the blow-by gas which is produced inside the internal combustion engine 10.

Furthermore, the system of the present embodiment includes an ECU (Electronic Control Unit) 50. There are connected to an input section of the ECU 50, various sensors for detecting an engine speed, a boost pressure and the like, as well as the air flow meter 34 described above. In addition, there are connected to an output section of the ECU 50, various actuators for controlling the operation of the internal combustion engine 10, such as the injector 12, the intake throttle valve 32, the HPL-EGR valve 38, the LPL-EGR valve 44 and the exhaust throttle valve 46 that are described above. The ECU 50 controls the operating state of the internal combustion engine 10 by actuating the various actuators on the basis of the output of each sensor and predetermined programs.

FIG. 2 is a cross-sectional view representing a characteristic configuration around the inlet of the compressor 20b according to the first embodiment of the present invention.

The compressor 20b is interposed at some point of the intake passage 26, and the inside thereof functions as a part of the intake passage 26. As shown in FIG. 2, there are formed in a housing 20b1 on the compressor 20b side in the turbo-supercharger 20: a compressor inlet section 20b2 connected to the intake passage 26 on the intake air upstream side; an impeller section 20b4 which houses a compressor impeller 20b3 fixed to the connecting axis 20c; a scroll section 20b5 that is spiral; and a diffuser section 20b6 that is located on the outer circumferential side of the impeller section 20b4 at between the impeller section 20b4 and the scroll section 20b5 and is a disk-shaped passage.

Fresh air (intake air) taken into the compressor 20b from the compressor inlet section 20b2 is pressurized when flowing through the impeller section 20b4 and the diffuser section 20b6, and is then exhausted into the intake passage 26 on the downstream side of the compressor 20b through the scroll section 20b5.

In addition, an EGR gas introduction section 40a and blow-by gas introduction section 48a which are introduction sections on the intake side of the respective LPL 40 and blow-by gas passage 48 described above are connected with the intake passage 26 near the compressor inlet section 20b2 as shown in FIG. 2. That is to say, the internal combustion engine 10 of the present embodiment is arranged so as to introduce the EGR gas (LPL-EGR gas) and the blow-by gas in such a way as to be suctioned by the compressor 20b.

As shown in FIG. 2, the internal combustion engine 10 of the present embodiment includes, inside the intake passage 26 near the compressor inlet section 20b2, a partition wall 52 as a gas guide member for guiding (introducing) the EGR gas and the blow-by gas toward the compressor 20b so that the EGR gas and the blow-by gas are not mixed with each other before entering into the impeller section 20b4.

More specifically, the partition wall 52 is a plate-like member for separating the intake passage 26 near the compressor inlet section 20b2, into an EGR gas introduction passage 26b1 into which the EGR gas is introduced and a blow-by gas introduction passage 26b2 into which the blow-by gas is introduced, and for insulating the EGR gas and the blow-by gas from each other. As shown in FIG. 2, the partition wall 52 is formed so as to extend to the inside of the compressor inlet section 20b2 from a position on the upstream side of each connection position of the EGR gas introduction section 40a and the blow-by gas introduction section 48a, and extend in parallel with the flow of intake air. However, the partition wall 52 herein is formed so as to extend to the inside of the compressor inlet section 20b2, the partition wall according to the present invention may be formed so as to extend to a section immediately before the compressor inlet section 20b2, instead of such formation.

Next, a problem concerning performance degradation of the turbo-supercharger 20 due to the collection of deposits to the compressor 20b will be described with reference to FIGS. 3 and 4.

Figure 3:
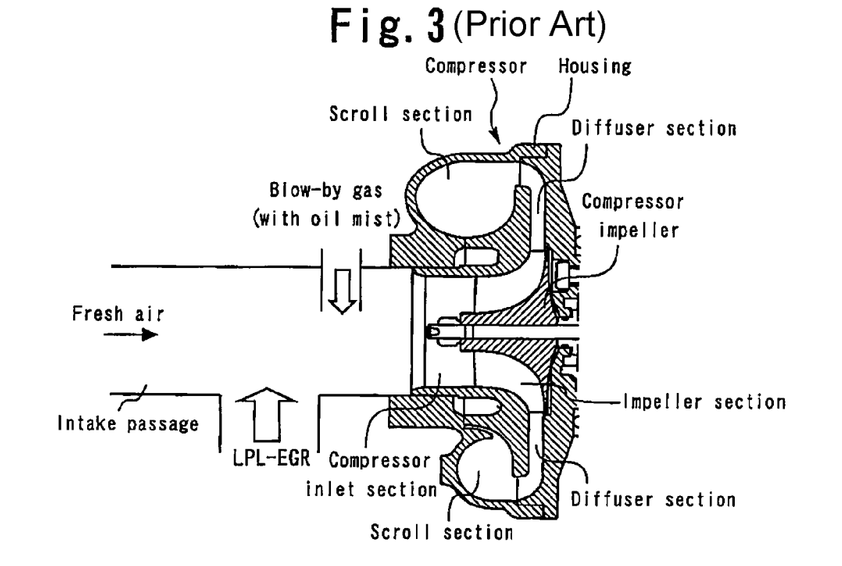
FIG. 3 is a diagram representing the configuration around the inlet of a general compressor that does not include the characteristic configuration shown in FIG. 2 according to the first embodiment of the present invention.

FIG. 3 is a diagram representing the configuration around the inlet of a general compressor that does not include the characteristic configuration shown in FIG. 2 according to the first embodiment of the present invention. In addition, FIG. 4 is a diagram representing a temperature distribution at the inlet of the compressor and in a diffuser section.

Figure 4:
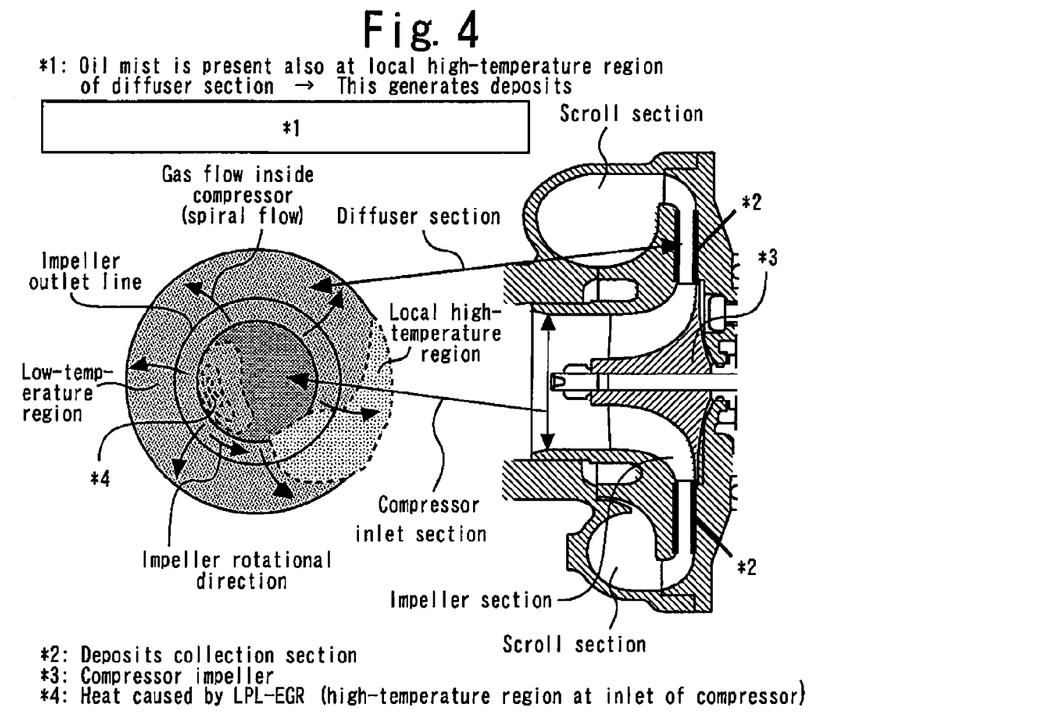
FIG. 4 is a diagram representing a temperature distribution at the inlet of the compressor and in a diffuser section.

As shown in FIG. 3, when the EGR gas is introduced to the intake passage from a section near the inlet of the compressor via the LPL, the unevenness of gas temperature as shown in FIG. 4 is generated at the inlet of the compressor due to the lack of mixing of high-temperature EGR gas and low-temperature (ordinary temperature) fresh air. The gas that has flown into the compressor flows through the inside of the compressor while circling in the direction as shown "Gas flow inside compressor" in FIG. 4 as a result of the compressor impeller rotating in the direction as shown "Impeller rotational direction" in FIG. 4. This causes a high-temperature section derived from the aforementioned lack of mixing to be locally generated inside of the diffuser with the manner as shown in FIG. 4. If the blow-by gas is introduced into the intake system from a section near the inlet of the compressor via the blow-by gas passage in a situation in which a high-temperature section exists locally inside the compressor in this manner, misty oil included in the blow-by gas comes into contact with the high-temperature section to evaporate. If the oil in the case were deteriorated (if the oil included soot), this would be collected on the diffuser section as deposits. Further, if the collection of such deposits progresses, there is a concern that performance degradation of the turbo-supercharger may occur.

Figure 5:
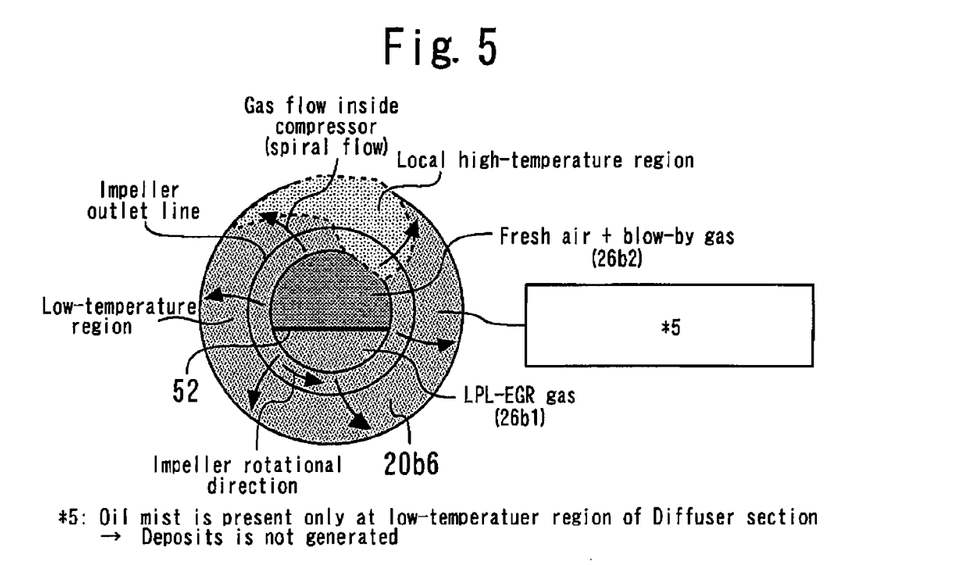
FIG. 5 is a diagram representing a temperature distribution at the compressor inlet and in the diffuser section in a case in which the characteristic configuration around the inlet of the compressor shown in FIG. 2 according to the first embodiment of the present invention is adopted.

FIG. 5 is a diagram representing a temperature distribution at the compressor inlet and in the diffuser section 20b6 in a case in which the characteristic configuration around the inlet of the compressor 20b shown in FIG. 2 according to the first embodiment of the present invention is adopted.

With respect to the aforementioned problem, as shown in FIG. 2, the internal combustion engine 10 of the present embodiment includes, inside the intake passage 26 near the compressor inlet section 20b2, the partition wall 52 as a gas guide member for guiding (introducing) the EGR gas and the blow-by gas toward the compressor 20b so that the EGR gas and the blow-by gas are not mixed with each other until they enter into the impeller section 20b4. As described above, the partition wall 52 is formed so as to extend to the inside of the compressor inlet section 20b2 from the position on the upstream side of each connection position of the EGR gas introduction section 40a and the blow-by gas introduction section 48a.

According to the conventional configuration that does not have the aforementioned partition wall 52 (see FIG. 3), the EGR gas and the blow-by gas are naturally mixed at the inlet of the compressor. In contrast, according to the internal combustion engine 10 of the present embodiment, since the EGR gas introduction passage 26b1 and the blow-by gas introduction passage 26b2 are insulated from each other by the aforementioned partition wall 52, high-temperature EGR gas and low-temperature blow-by gas are not mixed until they enter into the compressor 20b. More specifically, the fresh air and the blow-by gas flow through the blow-by gas introduction passage 26b2, and the EGR gas out of the EGR gas and the fresh air mainly flows through the EGR gas introduction passage 26b1.

As already described, the gas flows through the inside of the compressor 20b toward the downstream side while circling. Therefore, the EGR gas and the blow-by gas that are introduced inside the compressor 20b from the EGR gas introduction passage 26b1 and the blow-by gas introduction passage 26b2 with being insulated from each other at the inlet of the compressor 20b by the aforementioned partition wall 52 are not mixed even when passing through the inside of the compressor 20b (the impeller section 20b4 and the diffuser section 20b6). More specifically, when, for example, a high-temperature section has occurred locally inside the compressor 20b at the position as shown in FIG. 5 as a result of introduction of the EGR gas from the EGR gas introduction passage 26b1, the blow-by gas that is introduced into the inlet of the compressor 20b from the blow-by gas introduction passage 26b2 that is different from the EGR gas introduction passage 26b1 is exhausted to the scroll section 20b5 by passing through a low-temperature section other than the aforementioned high-temperature section in the diffuser section 20b6. This allows deposits to be prevented from being produced as a result of misty oil included in the blow-by gas evaporating at the aforementioned high-temperature section. Therefore, performance degradation of the turbo-supercharger 20 due to the collection of the deposits to the diffuser section 20b6 can be prevented.

Furthermore, the partition wall 52 of the present embodiment is formed so as to extend to the inside of the compressor inlet section 20b2 from the position on the intake air upstream side of each connection position of the EGR gas introduction section 40a and the blow-by gas introduction section 48a. By forming the partition wall 52 over the range, the EGR gas and the blow-by gas can be more surely prevented from being mixed with each other at the compressor inlet section 20b2.

Second Embodiment

Next, a second embodiment of the present invention will be described with reference to FIG. 6.

Figure 6:
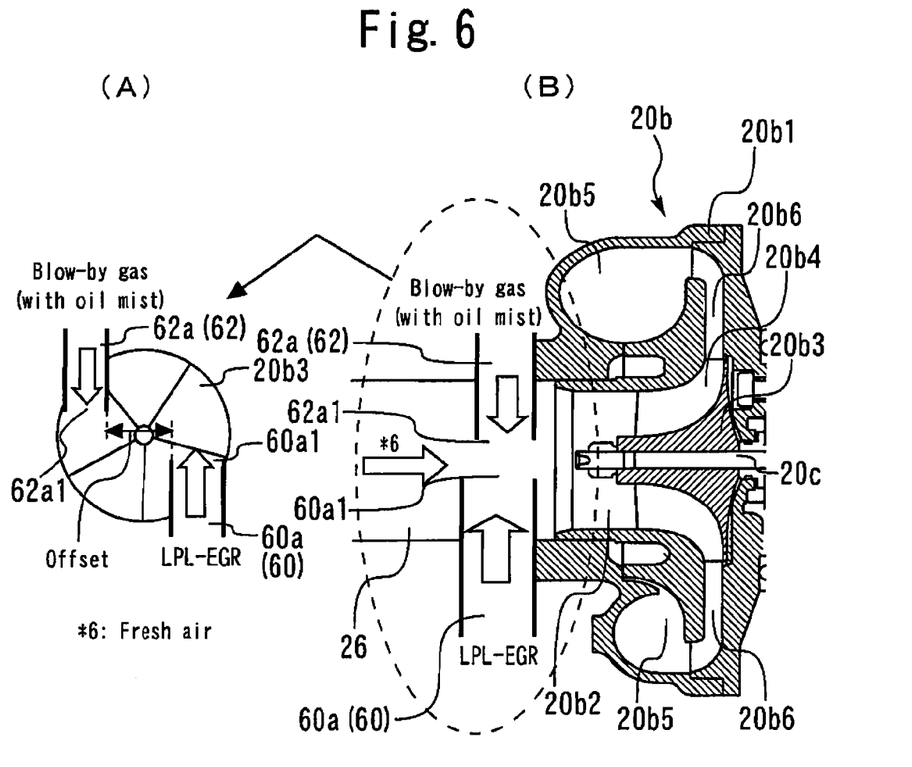
FIG. 6 is a diagram representing a characteristic configuration around the inlet of the compressor according to a second embodiment of the present invention.

FIG. 6 is a diagram representing a characteristic configuration around the inlet of the compressor 20b according to the second embodiment of the present invention. More specifically, FIG. 6(A) is a view of the compressor impeller 20b3 seen from the upstream side of intake air, and FIG. 6(B) is a cross sectional view at the inlet of the compressor 20b. It is noted that in FIG. 6, the same element as that shown in FIG. 2 is given the same reference character thereby omitting or simplifying the description thereof.

It is supposed that an internal combustion engine of the present embodiment is configured in a similar manner as in the internal combustion engine 10 of the above described first embodiment except for the differences between the configuration shown in FIG. 6 and the configuration shown in aforementioned FIG. 2. More specifically, the internal combustion engine of the present embodiment includes an EGR gas introduction section 60a of an LPL 60 and a blow-by gas introduction section 62a of a blow-by gas passage 62 that are configured as follows, as a gas guide member for guiding (introducing) the EGR gas and the blow-by gas toward the compressor 20b so that the EGR gas and the blow-by gas are not mixed with each other until the EGR gas and the blow-by gas enter into the impeller section 20b4.

As shown in FIG. 6(A), an EGR gas open end 60a1 of the EGR gas introduction section 60a and a blow-by gas open end 62a1 of the blow-by gas introduction section 62a are arranged so as to be located at positions that are separated in the radial direction of the compressor impeller 20b3 in such a manner that the central axis of the compressor impeller 20b3 (connecting shaft 20c) is sandwiched between the EGR gas open end 60a1 and the blow-by gas open end 62a1 when viewing the compressor inlet section 20b from the direction of intake air flow. In other words, when viewed from the direction shown in FIG. 6(A), these open end 60a1 and open end 62a1 are disposed at the respective positions that are mutually offset to the mutually opposite side with respect to the central axis of the compressor impeller 20b3, in the radial direction of the compressor impeller 20b3.

Furthermore, as shown in FIG. 6(B), these open ends 60a1 and 62a1 are installed at positions close to the compressor inlet section 20b2 in the direction of intake air flow so that the EGR gas and the blow-by gas introduced into the intake passage 26 from the open ends 60a1 and 62a1 are not mixed with each other before entering into the impeller section 20b4.

According to the configuration which includes the EGR gas introduction section 60a and the blow-by gas introduction section 62a described so far, the open ends 60a1 and 62a1 thereof are arranged so as to be located at the positions that are separated in the radial direction of the compressor impeller 20b3 in such a manner that the central axis of the compressor impeller 20b3 is interposed between the open ends 60a1 and 62a1 when viewing the compressor inlet section 20b from the direction of intake air flow, as shown in FIG. 6(A). This allows the EGR gas and the blow-by gas not to be mixed with each other when the EGR gas and the blow-by gas that are introduced from these open ends 60a1 and 62a1 are merged with the fresh air. In addition, as shown in FIG. 6(B), by installing the open ends 60a1 and 62a1 at the positions close to the compressor inlet section 20b2 in the direction of intake air flow, the EGR gas and the blow-by gas can be taken into the compressor 20*b* before these gases are mixed with each other.

As above, also according to the internal combustion engine of the present embodiment having the configuration (the gas guide member) shown in aforementioned FIG. 6, high-temperature EGR gas and low-temperature blow-by gas are not mixed before entering into the compressor 20*b*, and the EGR gas and the blow-by gas that are introduced into the compressor 20*b* in this manner are not mixed when passing through the inside of the compressor 20*b* (the impeller section 20*b*4 and the diffuser section 20*b*6). This allows deposits to be prevented from being produced as a result of misty oil included in the blow-by gas evaporating at the aforementioned high-temperature section. Therefore, performance degradation of the turbo-supercharger 20 due to the collection of the deposits to the diffuser section 20*b*6 can be prevented.

Furthermore, according to the gas guide member of the present embodiment, the pressure loss of the gas passing through the intake passage 26 can be prevented from being generated since there is no obstacle inside the intake passage 26 in contrast to the above described first embodiment using the partition wall 52. In addition, the gas guide member of the present embodiment has an advantage also in terms of cost as compared with the above described first embodiment because it is achieved with the devised arrangement of connecting sections of the LPL 60 and blow-by gas passage 62 to the intake passage 26 (the EGR gas introduction section 60*a* and the blow-by gas introduction section 62*a*).

Third Embodiment

Next, a third embodiment of the present invention will be described with reference to FIG. 7.

Figure 7:
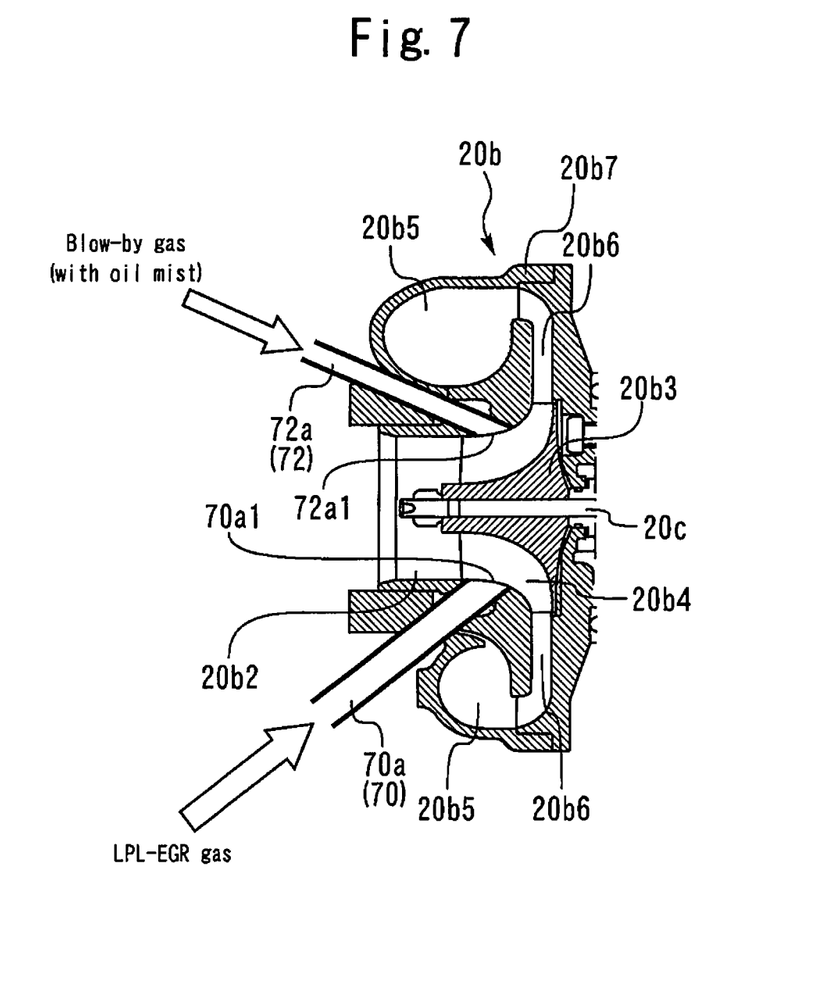
FIG. 7 is a cross sectional view representing a characteristic configuration around the inlet of the compressor according to a third embodiment of the present invention.

FIG. 7 is a cross sectional view representing a characteristic configuration around the inlet of the compressor 20*b* according to the third embodiment of the present invention. It is noted that in FIG. 7, the same element as that shown in aforementioned FIG. 2 is given the same reference character thereby omitting or simplifying the description thereof.

It is supposed that an internal combustion engine of the present embodiment is configured in a similar manner as in the internal combustion engine 10 of the above described first embodiment except for the differences between the configuration shown in FIG. 7 and the configuration shown in aforementioned FIG. 2. More specifically, the internal combustion engine of the present embodiment includes an EGR gas introduction section 70*a* of an LPL 70 and a blow-by gas introduction section 72*a* of a blow-by gas passage 72 that are configured as follows, as a gas guide member for guiding (introducing) the EGR gas and the blow-by gas toward the compressor 20*b* so that the EGR gas and the blow-by gas are not mixed with each other until the EGR gas and the blow-by gas enter into the impeller section 20*b*4.

As shown in FIG. 7, the EGR gas introduction section 70*a* and the blow-by gas introduction section 72*a* are arranged so as to penetrate through the housing 20*b*7 on the compressor 20*b* side in the turbo-supercharger 20; and an EGR gas open end 70*a*1 and a blow-by gas open end 72*a*1 are each arranged so as to open, into the impeller section 20*b*4, at positions that are separated in the radial direction of the compressor impeller 20*b*3. That is to say, the EGR gas introduction section 70*a* and the blow-by gas introduction section 72*a* are configured so as to be able to introduce the EGR gas and the blow-by gas independently and directly to the impeller section 20*b*4 (corresponding to a part of the intake passage 26 that is located inside the compressor 20*b*).

More specifically, as shown in FIG. 7, these open ends 70*a*1 and 72*a*1 are arranged so as to be located at positions that are separated (positions on the opposite side) in the radial direction of the compressor impeller 20*b*3 in such a manner that the central axis of the compressor impeller 20*b*3 is sandwiched between the open ends 70*a*1 and 72*a*1. In addition, these open ends 70*a*1 and 72*a*1 are arranged so as to be located at a section before the supercharging of the intake gas is started in the impeller section 20*b*4.

According to the configuration which includes, as a gas guide member, the EGR gas introduction section 70*a* and the blow-by gas introduction section 72*a* described so far, the EGR gas and the blow-by gas can be independently and directly introduced into the impeller section 20*b*4 (before the start of supercharging), as shown in FIG. 7. Also according to such configuration, high-temperature EGR gas and low-temperature blow-by gas are not mixed before entering into the compressor 20*b*, and the EGR gas and the blow-by gas that are introduced into the compressor 20*b* in this manner are not mixed when passing through the inside of the compressor 20*b* (the impeller section 20*b*4 and the diffuser section 20*b*6). This allows deposits to be prevented from being produced as a result of misty oil included in the blow-by gas evaporating at the aforementioned high-temperature section. Therefore, performance degradation of the turbo-supercharger 20 due to the collection of the deposits to the diffuser section 20*b*6 can be prevented.

Incidentally, in the third embodiment, which has been described above, an arrangement is made such that the EGR gas and the blow-by gas can be independently and directly introduced into the impeller part 20*b*4 through the EGR gas introduction section 70*a* and the blow-by gas introduction section 72*a* which are included as a gas guide member. However, the gas guide member in the present invention is not limited to such arrangement. More specifically, the recirculated exhaust gas introduction section and the blow-by gas introduction section are not limited to one that is connected to the impeller section and may be the compressor inlet section on the upstream side of the impeller section.

Moreover, in the first to third embodiments, which have been described above, the description has been made taking an example of the turbo-supercharger that is driven by exhaust energy, as a supercharger having the centrifugal compressor 20*b*. However, the supercharger of the present invention is not limited to the turbo-supercharger, provided that a centrifugal compressor is included. More specifically, the supercharger of the present invention may, for example, include a centrifugal compressor driven by use of the power from a crankshaft of an internal combustion engine, or include a centrifugal compressor driven by an electrically-driven motor.

DESCRIPTION OF SYMBOLS 10 internal combustion engine
12 injector
18 exhaust passage
20 turbo-supercharger
20*a* turbine of turbo-supercharger
20*b* centrifugal compressor of turbo-supercharger
20*b*1, 20*b*7 housing of centrifugal compressor
20*b*2 compressor inlet section of centrifugal compressor
20*b*3 compressor impeller
20*b*4 impeller section of centrifugal compressor
20*b*5 scroll section of centrifugal compressor 20b6 diffuser section of centrifugal compressor
20c connecting shaft of turbo-supercharger
26 intake passage
26b1 recirculated exhaust gas (EGR gas) introduction passage
26b2 blow-by gas introduction passage
36 high pressure exhaust gas recirculation passage (HPL)
38 HPL-EGR valve
40, 60, 70 low pressure exhaust gas recirculation passage (LPL)
40a, 60a, 70a recirculated exhaust gas (EGR gas) introduction section of LPL
42 EGR cooler
44 LPL-EGR valve
48, 62, 72 blow-by gas passage
48a, 62a, 72a blow-by gas introduction section of blow-by gas passage
50 ECU (Electronic Control Unit)
52 partition wall
60a1, 70a1 recirculated exhaust gas (EGR gas) open end
62a1, 72a1 blow-by gas open end

The invention claimed is:

1. A supercharger-equipped internal combustion engine, comprising:
    a supercharger which includes a centrifugal compressor provided with an intake passage and having an impeller section for housing a compressor impeller;
    an exhaust gas recirculation passage which includes an exhaust gas recirculation introduction section connected with the intake passage and through which recirculated exhaust gas flows;
    a blow-by gas passage which includes a blow-by gas introduction section connected with the intake passage and through which blow-by gas flows; and
    a gas guide member which extends to an inside of an inlet section of the centrifugal compressor or a section immediately before the inlet section or the impeller section of the centrifugal compressor,
    wherein the recirculated exhaust gas and the blow-by gas are introduced to an intake system in such a manner as to flow into the centrifugal compressor via the exhaust gas recirculation introduction section and the blow-by gas introduction section, and
    wherein the gas guide member guides the recirculated exhaust gas and the blow-by gas toward the centrifugal compressor so that the recirculated exhaust gas and the blow-by gas are not mixed with each other until the recirculated exhaust gas and the blow-by gas enter into the impeller section of the centrifugal compressor and so that the recirculated exhaust gas and the blow-by gas are suctioned into the impeller section from different sections in a circumferential direction of the compressor impeller.

2. The supercharger-equipped internal combustion engine according to claim 1,
    wherein the gas guide member is a partition wall formed so as to extend to an inside of an inlet section of the centrifugal compressor or a section immediately before the inlet section, for separating the intake passage near an inlet of the centrifugal compressor, into an exhaust gas recirculation introduction passage into which the recirculated exhaust gas is introduced via the exhaust gas recirculation introduction section and a blow-by gas introduction passage into which the blow-by gas is introduced via the blow-by gas introduction section, and for insulating the recirculated exhaust gas and the blow-by gas from each other.

3. The supercharger-equipped internal combustion engine according to claim 2,
    wherein the partition wall is formed so as to extend to an inside of an inlet section of the centrifugal compressor or a section immediately before the inlet section, from a position on an upstream side of each connection position of the exhaust gas recirculation introduction section and the blow-by gas introduction section with respect to the intake passage on an upstream side of the centrifugal compressor, and extend in parallel with a flow of intake air.

4. The supercharger-equipped internal combustion engine according to claim 1,
    wherein the gas guide member corresponds to the exhaust gas recirculation introduction section and the blow-by gas introduction section, which include an exhaust gas recirculation open end and a blow-by gas open end, respectively, the exhaust gas recirculation open end and the blow-by gas open end being arranged so as to be located at positions that are separated in a radial direction of the compressor impeller in such a manner that a central axis of the compressor impeller is sandwiched between the exhaust gas recirculation open end and the blow-by gas open end, the exhaust gas recirculation open end and the blow-by gas open end being installed at positions close to the inlet section of the compressor.

5. The supercharger-equipped internal combustion engine according to claim 1,
    wherein the gas guide member corresponds to the exhaust gas recirculation introduction section and the blow-by gas introduction section, which include an exhaust gas recirculation open end and a blow-by gas open end, respectively, the exhaust gas recirculation open end and the blow-by gas open end being arranged so as to open, into the impeller section or an compressor inlet section on an intake air upstream side of the impeller section, at positions that are separated in a radial direction of the compressor impeller.

* * * * *